(12) United States Patent
Motamed et al.

(10) Patent No.: US 6,549,300 B2
(45) Date of Patent: Apr. 15, 2003

(54) METHOD AND APPARATUS FOR TAB PRINTING

(75) Inventors: Margaret Motamed, Foster City, CA (US); Minh Vo, Santa Clara, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/791,111

(22) Filed: Feb. 22, 2001

(65) Prior Publication Data

US 2001/0046059 A1 Nov. 29, 2001

Related U.S. Application Data

(60) Provisional application No. 60/184,791, filed on Feb. 24, 2000.

(51) Int. Cl.[7] .............................................. G06F 15/00
(52) U.S. Cl. .................... 358/1.18; 358/1.12; 358/1.15; 358/1.1; 358/296; 345/751
(58) Field of Search ............................... 358/1.15, 1.12, 358/1.14, 1.13, 1.18, 403, 443, 488, 1.1, 296, 452; 382/309; 399/82, 85; 345/751

(56) References Cited

U.S. PATENT DOCUMENTS

| 4,839,829 A | * | 6/1989 | Freedman .................... 345/751 |
| 5,337,161 A | | 8/1994 | Hube |
| 5,666,208 A | * | 9/1997 | Farrell et al. ................ 358/296 |
| 5,946,461 A | | 8/1999 | Landry et al. |
| 6,049,391 A | * | 4/2000 | Farrell ........................ 358/1.15 |

FOREIGN PATENT DOCUMENTS

GB 2227718 A * 8/1990 .......... G06K/15/00

* cited by examiner

Primary Examiner—Edward Coles
Assistant Examiner—Twyler Lamb

(57) ABSTRACT

A method and apparatus which configures a printer for printing ordered stock by using a template. The template has various parameters which the user inputs. Examples of input parameters involve the printing of tabs. A user inputs tab parameters such as the number of positions, text offset per tab, tab media size, text rotation, document reading order, tray source, tab font size, tab font type, tab sheet location and tab text. Templates can be saved and repeatedly used. A user can save and create new templates or edit previously created templates.

22 Claims, 14 Drawing Sheets

METHOD AND APPARATUS FOR TAB PRINTING

This application claims the benefit of 60/184,791, filed Feb. 24, 2000.

BACKGROUND OF THE INVENTION

TECHNICAL FIELD

The invention relates to printing. More particularly, the invention relates to an apparatus and a family of methods for printing ordered stock such as precut tabs.

DESCRIPTION OF THE PRIOR ART

Future electronic printer and printing systems are intended to provide the user with as many job programming options and selections as possible. One programming option recently developed by U.S. Pat. No. 5,133,048 to Parsons et al discloses a high speed electronic printing system for processing ordered stock such as tabbed sheets. The system described ensures when using precut tabs the image being printed matches up with the correct tab and that it remains so during that entire printing process.

However, what Parsons fails to account for is that tab printing jobs have repeated use. That is, a format used for printing tabs is often used repeatedly. According to Parsons, a user must re-enter such format values when performing a tab printing job. What is needed is a method to perform the same tab printing jobs repeatedly without having to re-enter the format values.

A user also desires to have many printing options when printing tabs. Such options include setting the number of positions, the text offset per tab, the tab media size, text rotation, document reading order, tray source, the tab font size, the tab font type, tab sheet location and tab text and text color. What is needed is a method to perform these options.

SUMMARY OF THE INVENTION

A method and apparatus is disclosed which configures a printer for printing ordered stock by using a template. The template has various parameters which the user inputs. Such examples of input parameters involve the printing of tabs. A user inputs tab parameters such as the number of positions, text offset per tab, tab media size, text rotation, document reading order, tray source, tab font size, tab font type, tab sheet location and tab text. Templates can be saved and repeatedly used. A user can save and create new templates or edit previously created templates.

DESCRIPTION OF THE PREFERRED EMBODIMENTS

Figure 1A:
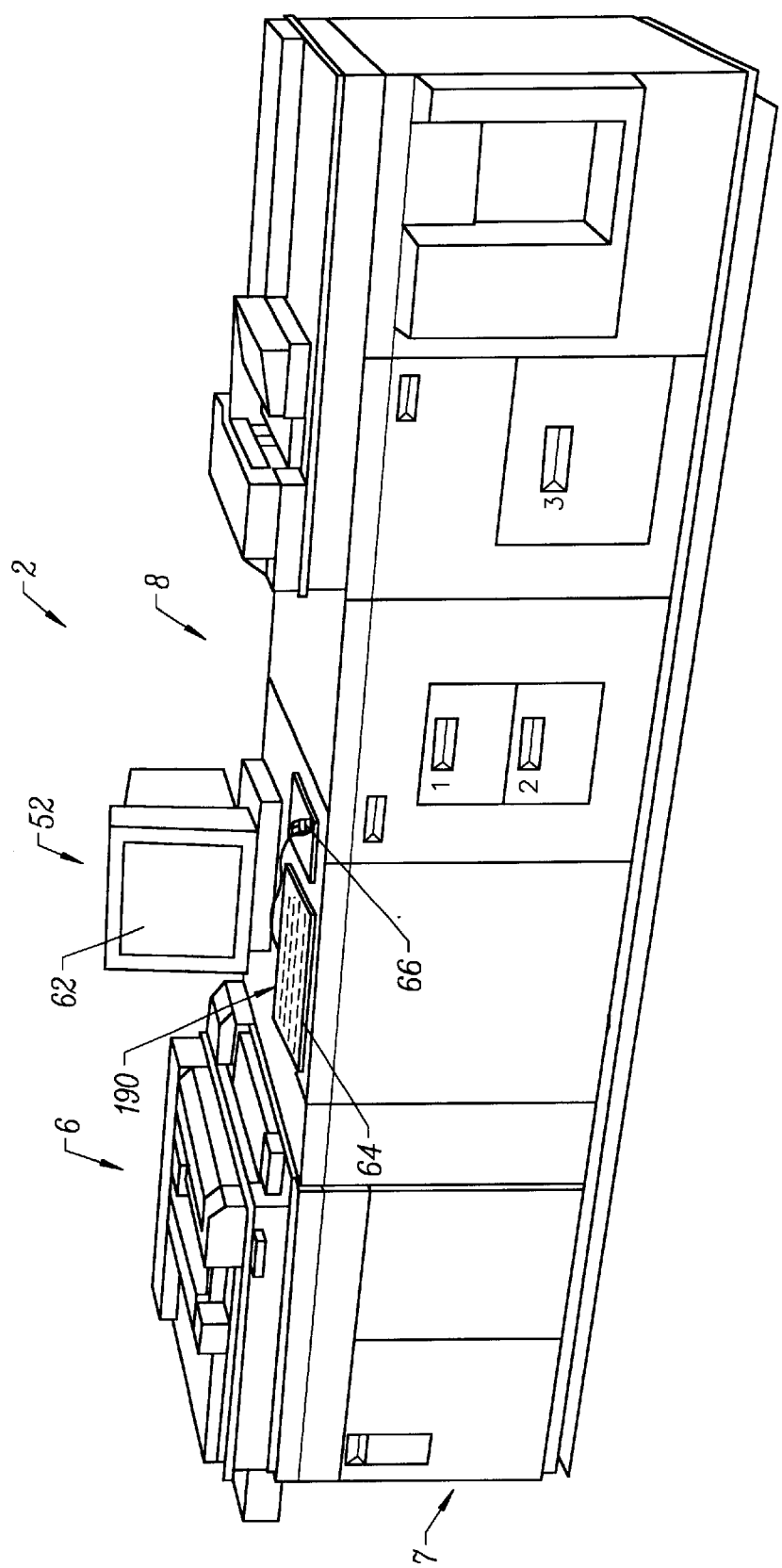
FIGS. 1A and 1B comprise a view depicting an electronic printing system for printing from ordered stock of the present invention.
Figure 1B:
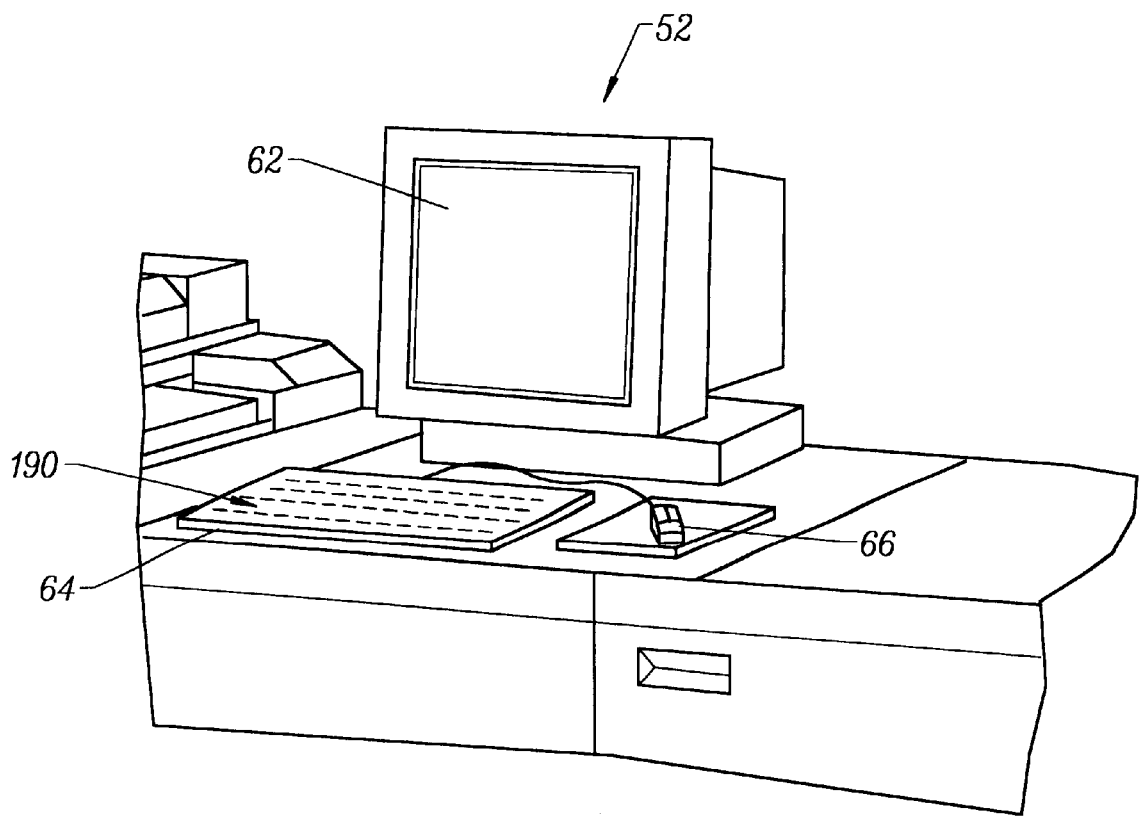
Figure 2:
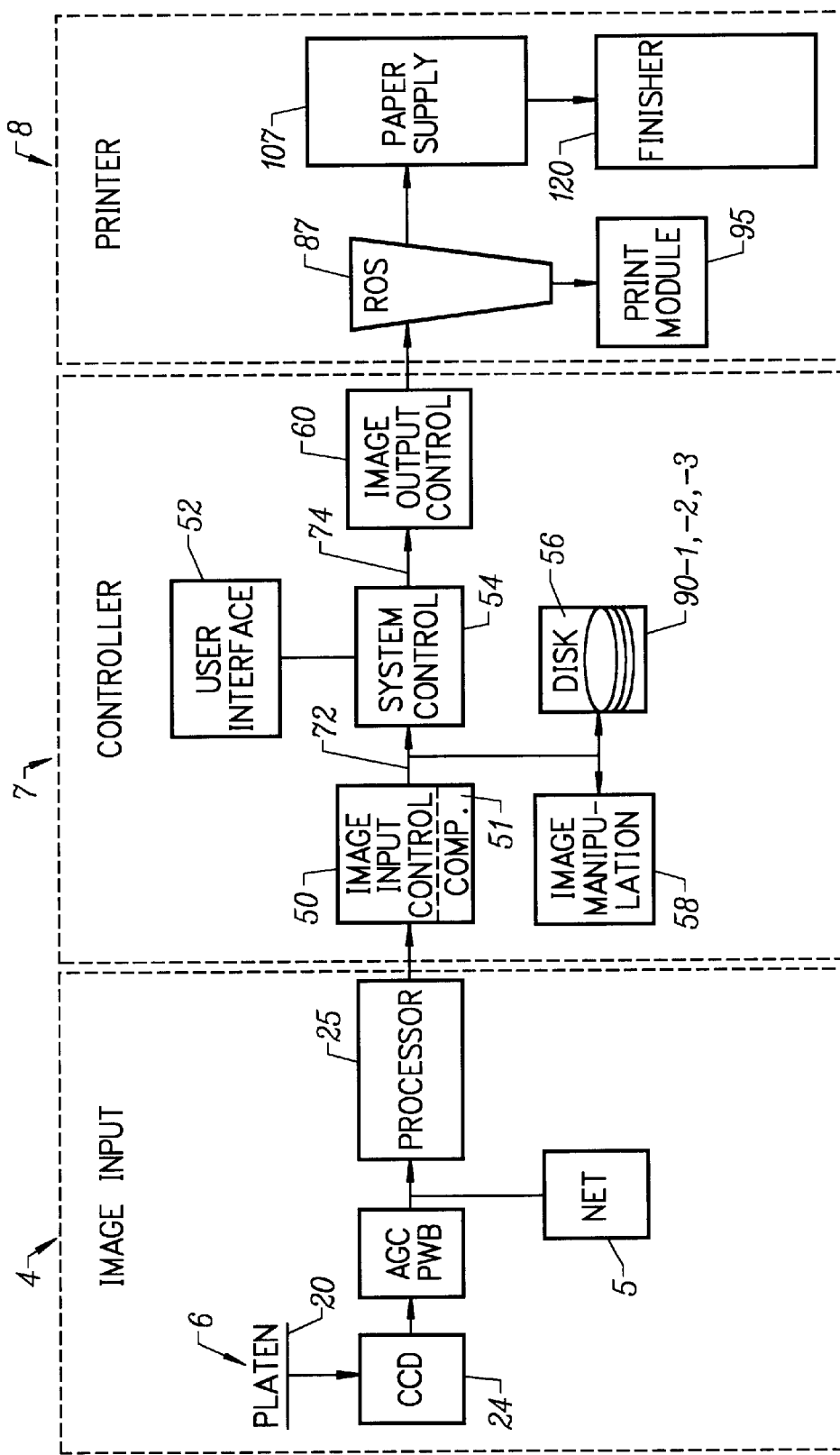
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
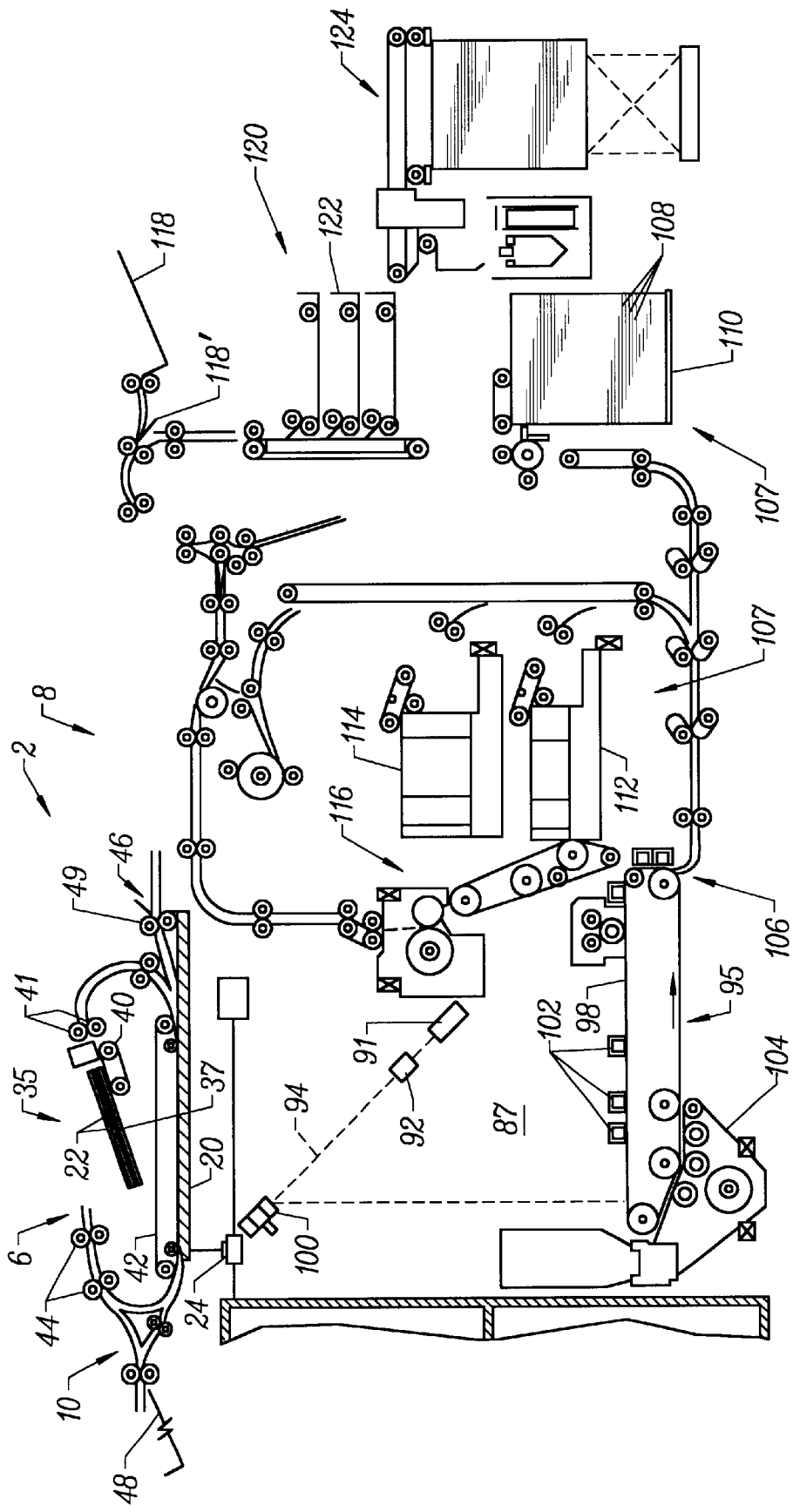
FIG. 3 is a plan view illustrating the principal mechanical components of the printing system shown in FIG. 1.
Figure 4:
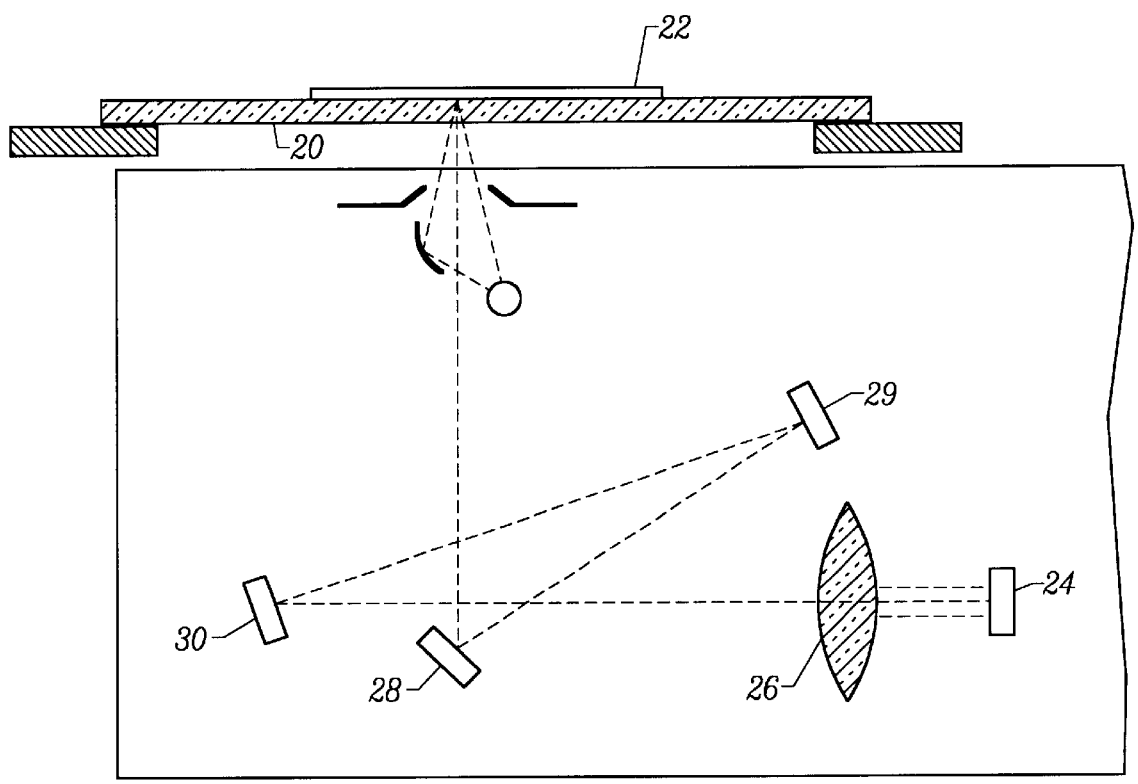
FIG. 4 is a schematic view showing certain construction details of the document scanner for the printing system shown in FIG. 1.

Referring particularly to FIGS. 2–4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen best in FIG. 1B, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 (seen in FIG. 7) to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Figure 5A:
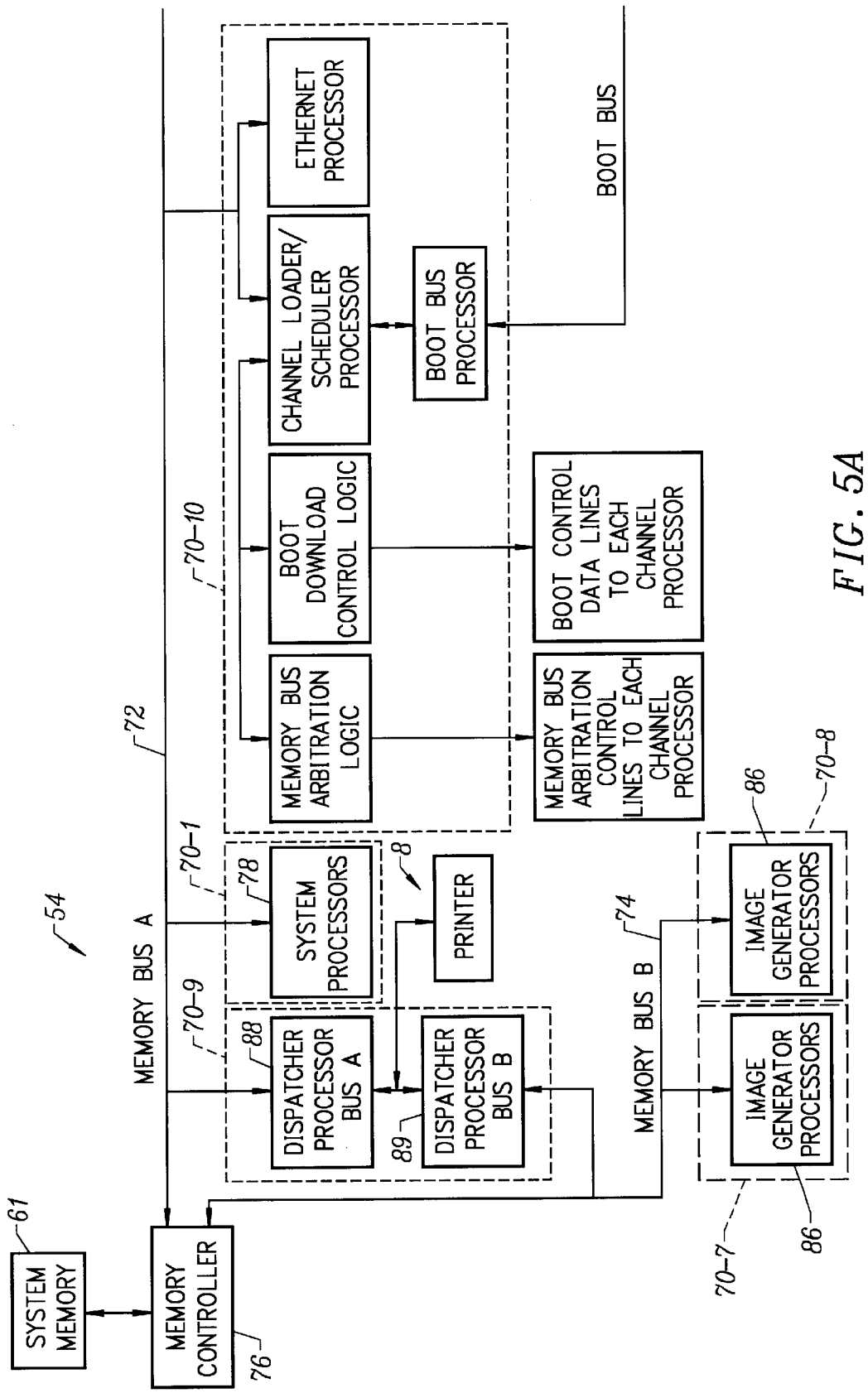
FIGS. 5A, 5B, and 5C comprise a schematic block diagram showing the major parts of the control section for the printing system shown in FIG. 1.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 5B:
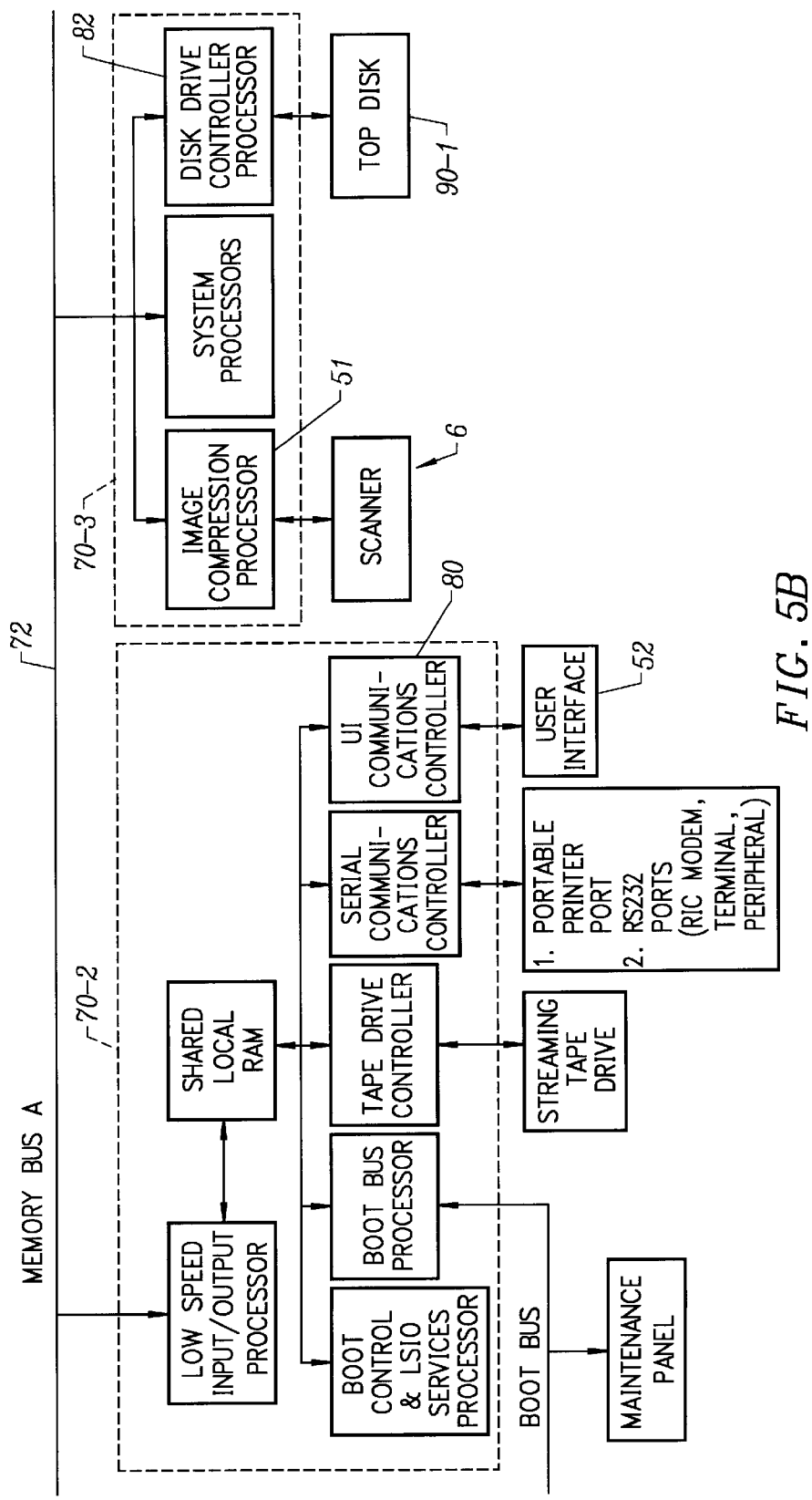
Figure 5C:
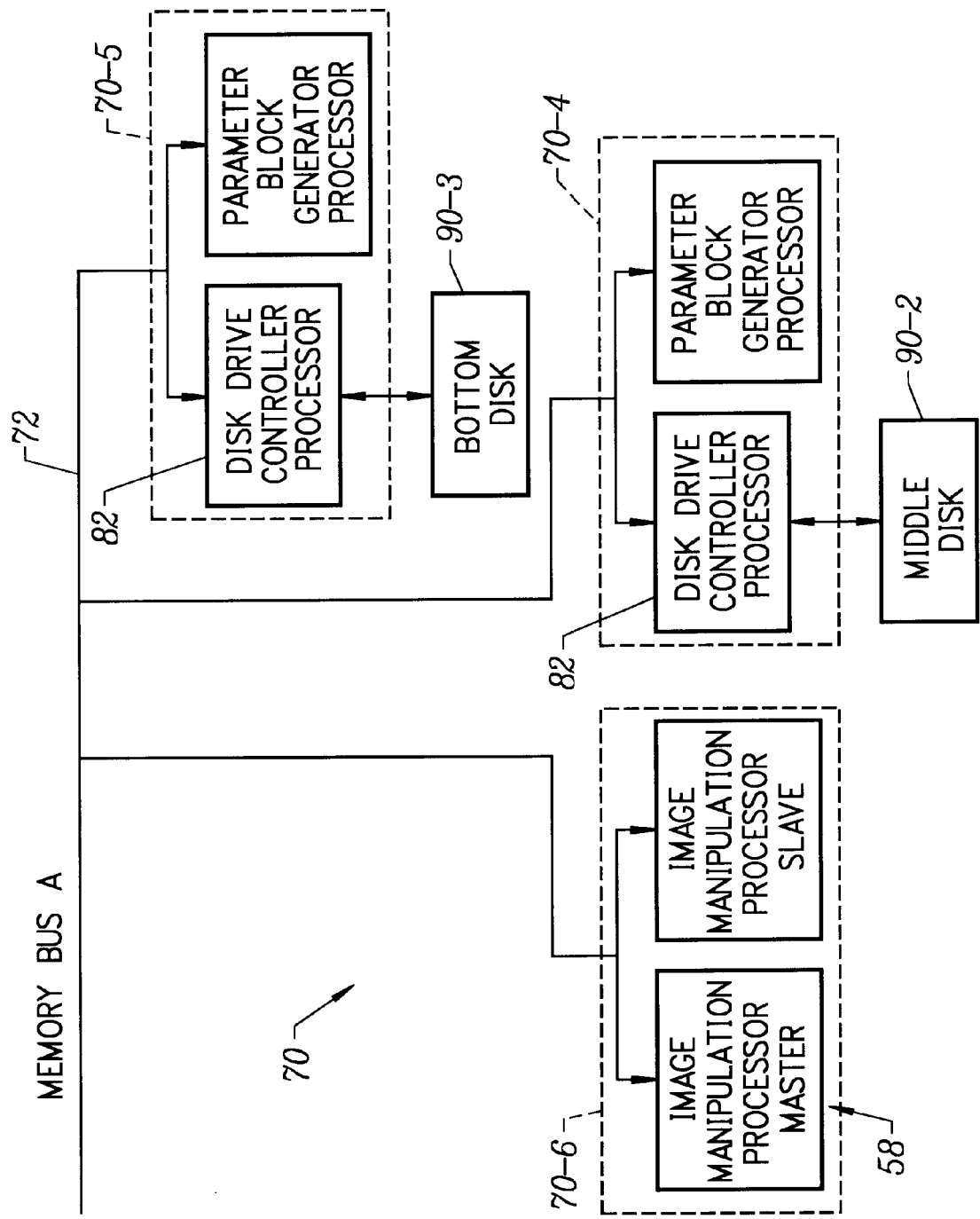

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
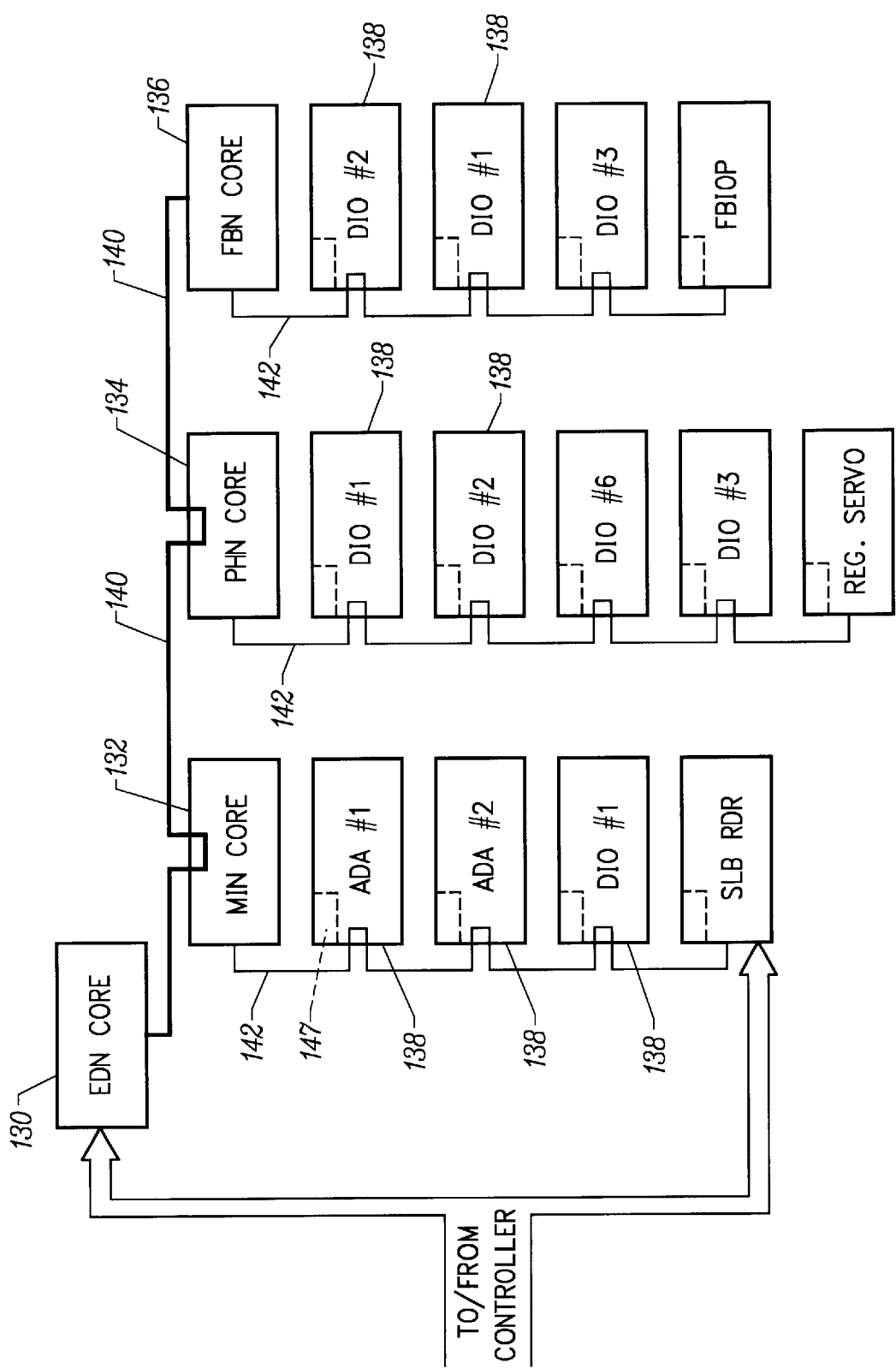
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/

Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

The preferred embodiment of the invention uses a template to store printing parameters and information about a print job involving ordered stock. The template can be stored in a computer memory, for example, on a hard drive or on a form of ram. The template can be recalled by a user to restore the printing parameters stored on the template. Those parameters can then be used for a print job.

Tabs are typical of the type of ordered stock used. Tabs are often inserted in between sheets of paper to indicate what type of information is contained on the sheets. The use of a template and its associated setup windows to configure a printer when printing tabs is hereinafter referred to as InsertTabs.

A user inputs tab printing parameters at two points of operations. The points of operations are the InsertTabs setup flow, a pre-setup period before a print job is started, and the InsertTabs user/operator workflow, the period when the print job is performed. In one embodiment of the invention, it is possible for a user to setup up all parameters to be reused at a later time, e.g. as template for chapters. Alternatively, some parameters must always be entered right before the print job.

INSERT TABS SETUP FLOW

Figure 7:
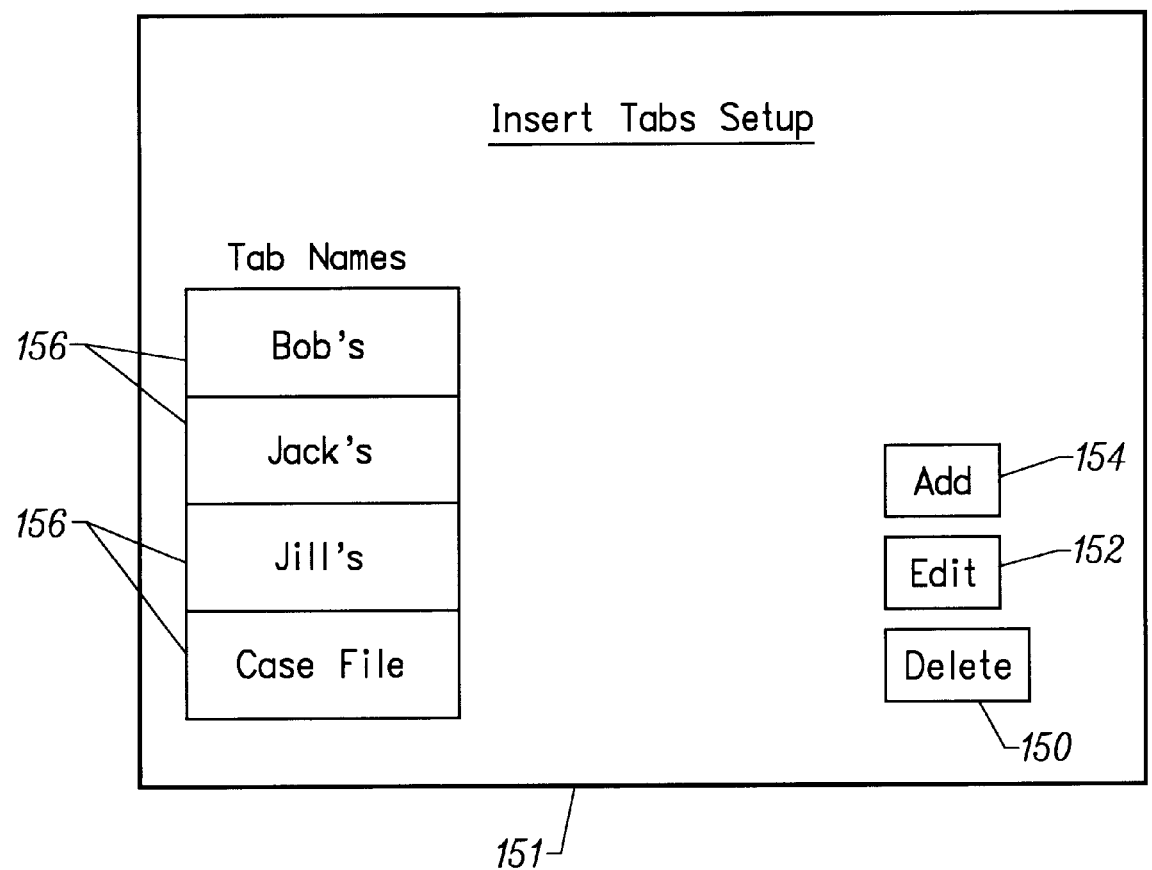
FIG. 7 is a diagram of the main setup window.

FIG. 7 shows the "InsertTabs Setup" window 151. Using an input device such as a keyboard or mouse, a user can delete 150 or edit 152 an existing tab media name 156 or add 154 a new tab media name by selecting the appropriate button. When a user selects either the edit 152 or add 154 buttons, the "Tab Media Name Edit" window 160 appears.

Figure 8:
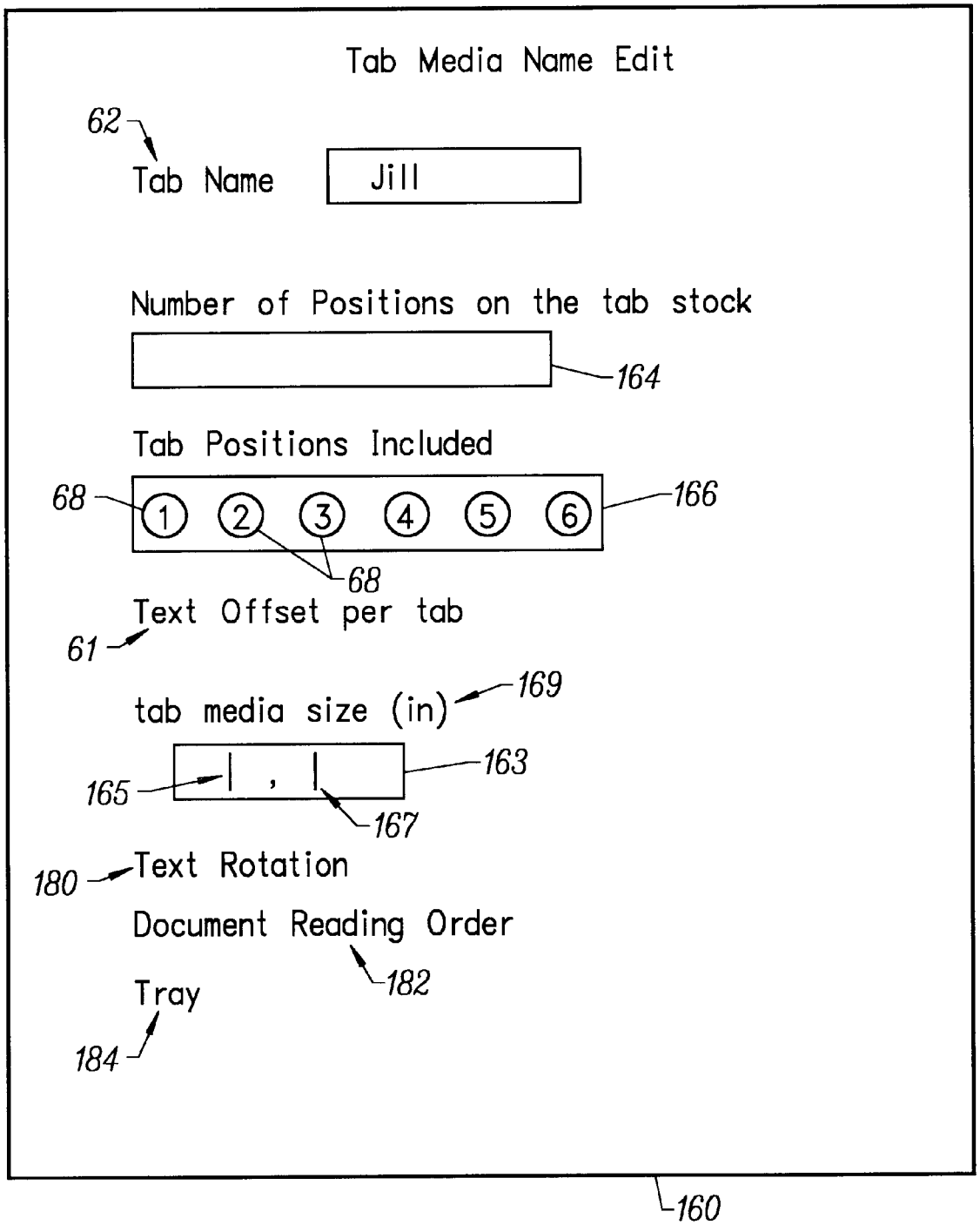
FIG.8 is a diagram of the window for changing the tab name, position, offset, size, text rotation, document reading order and source tray.

FIG. 8 shows the "Tab Media Name Edit" window 160. In the "Tab Name" box 162, a user edits or creates a tab media name.

Figure 9:
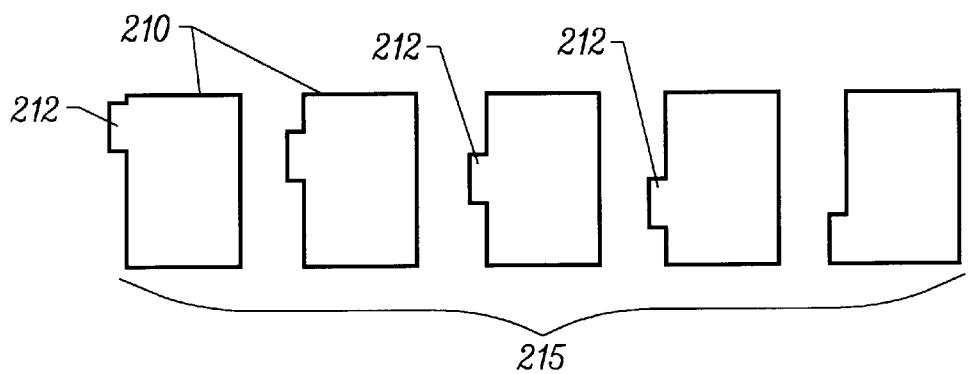
FIG. 9 is an plane view showing a 5 tab example of precut tab stock.
Figure 10:
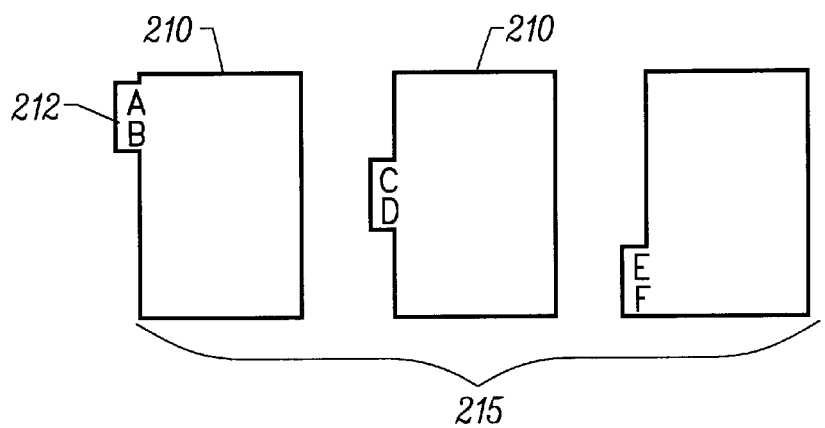
FIG. 10 is an isometric plane view showing a 3 tab example of preprinted tab stock.

With the "Number of Positions on the tab stock" button 164 a user, through a pull down menu, selects the number of tab offset positions used. Referring now to FIG. 9, tabbed stock (i.e. "Precut Tab") comprises a sheet 210 of print media stock having a tab 212 projecting from one side. As will be understood, tabbed sheets 210 are typically used to facilitate access to specific pages or areas in a bound document or book. Tabs 212 may be clear, that is, without printing as shown in FIG. 9 or may have information or data preprinted thereon as in the preprinted tabs shown in FIG. 10.

The location of tabs 212 along the sides of the tabbed sheet 210 are normally offset from one another to prevent one tab from blocking viewing of the other tabs. The number of tab offset positions determines the number of tabbed sheets 210 in a series or set 215. In the example shown in FIG. 9, a set 215 composed of 5 tabbed sheets is shown. In the example shown in FIG. 10, a set 215 composed of 3 tabbed sheets 215 of preprinted tabs 212 is shown.

Often, some tab positions are not used. In the "Tab positions included" box 166 a user may picks the tabs that will be used. The default setting is that all Tab positions are used. A user deselects tab positions which will not be used by selecting the appropriate radial buttons 168.

Figure 11:
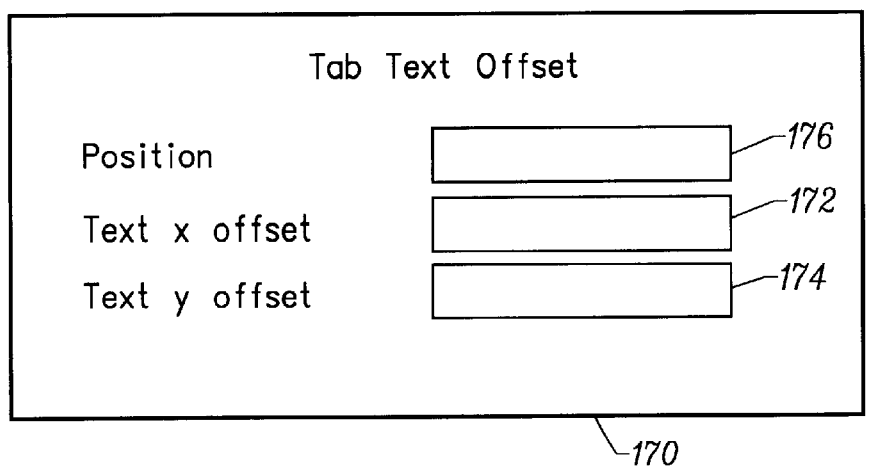
FIG. 11 is a diagram of the window for changing the x offset and y offset for a tab position.

A user may vary the x offset and y offset of a tab position by selecting the "Text offset per tab" button 161. Selecting the "Text offset per tab" button opens the "Tab Text Offset" window as shown in FIG. 11. The default offset for the x and y variables is zero. A user selects a tab by entering its position in the "Position" box 176. A user then inputs the offset value by entering a fraction and designating a sign value in the x offset 172 and y offset 174 boxes . In the preferred embodiment of the invention, the offset is relative to the top left, but any offset may be used.

A user can enter the tab media size by entering its length (x) 165 and width (y) 167 in the "Tab Media Size" box 163. The user also selects the units 169 the tab media is measured by. The units are either inches or centimeters.

The text contained in the tab can be rotated to a desired selection. A user inputs a numerical value between 0–360, corresponding to a degree value in the "Text Rotation" box 180.

In the preferred embodiment of the invention, there is a pull down menu that has pre-designated values. It will be appreciated by those skilled in the art that such pre-designated values are not necessary. In the preferred embodiment of the invention, the terms "in" and "out" refer to the manner in which the image is rotated.

A user enters his choice for the document reading order by selecting the "Document reading order" button 182. A drop down menu appears when the button is selected, offering the choices of pull down, right-to-left and left-to-right. A user selects which choice he desires.

A user selects the source tray the tabbed sheets are stored in by selecting the "Tray" button 184. A pull down menu appears showing the available trays in the printer. A user then selects from the available choices.

INSERTTABS USER/OPERATOR WORKFLOW

A user, before using the "InsertTabs", "Tab Media for job setup", and "Tab Text edit" windows, must first download to the printer the InsertTabs program. Alternatively, a user may print to hold queue or make via DocBuilder Pro™ the PS/PDF file on the Fiery™.

[IN the preferred embodiment of the invention, the InsertTabs feature is a sub-menu of a larger printing program, i.e. it is accessible from different client/operator programs. The d/l, hold queue, and making of the PS/PDF file are specific to the Fiery workflow, and are not necessary for full implementation of the invention.

For purposes of the discussion herein, the term "cws" refers to EFI's Command Work Station™.

Figure 12:
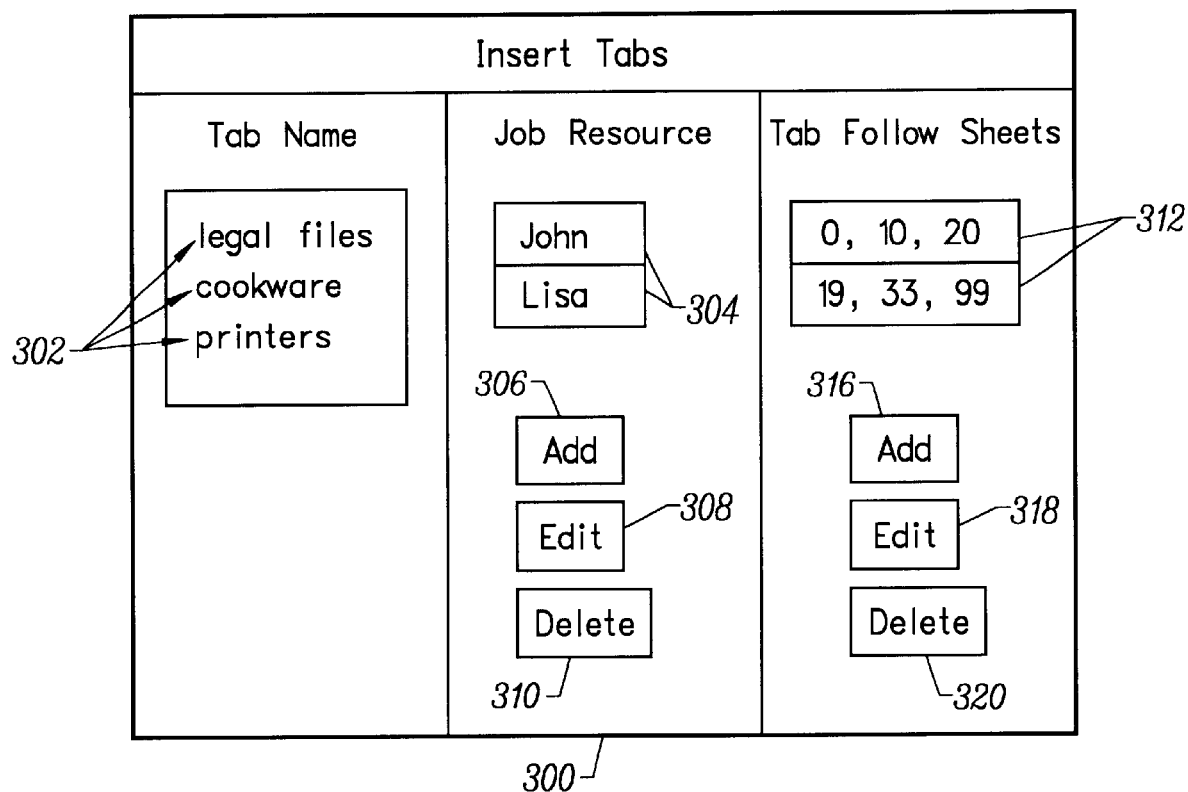
FIG. 12 is a diagram of the window showing the job resources and tab follow sheets for each tab media.

In FIG. 12 the "InsertTabs" window is shown 300. The "InsertTabs" window lists the tab media names 302 and has two scroll boxes. The first scroll box lists the job resources 304 for each tab media.

Add 306, edit 308 and delete 310 buttons are available to the user. Selection of the add 306 or edit 308 buttons brings up the "Tab Media for job setup" window 400.

The second scroll box displays the follow sheet entries 312 for the corresponding tab media names. Add 316, edit 318 and delete 320 buttons are displayed. Selection of the add 316 or edit 318 buttons brings up the "Tab text edit" window 500.

Figure 13:
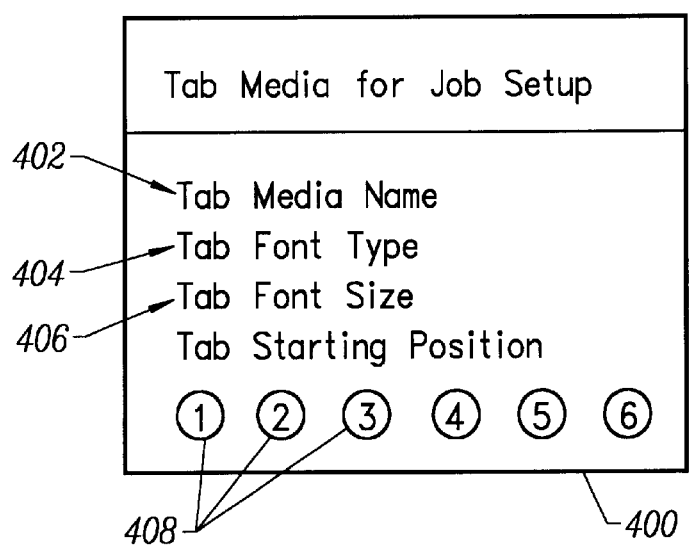
FIG. 13 is a diagram of the window for changing the font type, font size and tab starting position.

FIG. 13 shows the "Tab Media for job setup" window. This window lists the tab media names 402 in a pull down menu, previously created by the user. The user selects which tab media he wishes to use for the print job. The user also selects the tab font type by selecting the tab font type button 404. When the user selects the "tab font type" button, a pull down menu displaying the available fonts is shown. The default font type is Helvetica-bold. The user selects the tab font size by selecting the "tab font size" button 406. When the user selects the "tab font size" button, a pull down menu displaying the available font sizes is shown. The default font size is 10.

The user then selects the tab starting position by deselecting from the list of radial boxes 408 representing the current number of possible tab positions. The default is that all radial boxes are selected. If a user desires position one to be the starting tab position he does not have to alter the default settings. If a user desires to have tab position two be the starting position, the user would deselect radial button one. Thus tab position two would then be the first tab position.

If only one tab starting position is selected, special workflow applies. For purposes of the preferred embodiment of the invention, a special workflow is an optional user defined workflow as is known in the art Also, in the preferred embodiment of the invention, if only one tab starting position is selected the special workflow applies.

Figure 14:
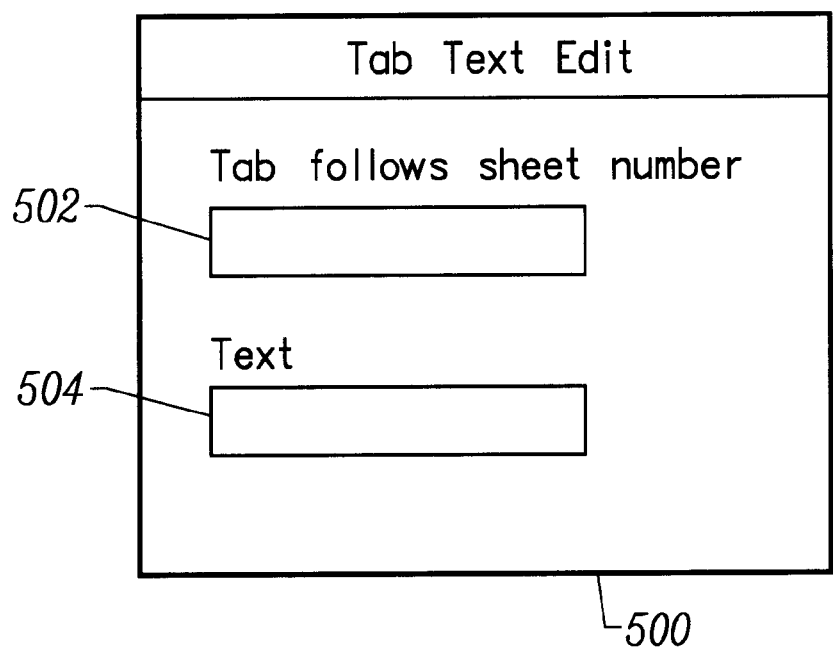
FIG. 14 is a diagram of the window for changing the tab text and where the tabs are located.

FIG. 14 shows the "Tab Text edit" window 500. In the "Tab Text edit" window 500 a user enters the location of the tabbed sheets in the printer tray by typing which sheet or sheets they follow in the "Tab follows sheet number" box 502. A user also enters the tab text in the "Text" box 504.

Figure 15:
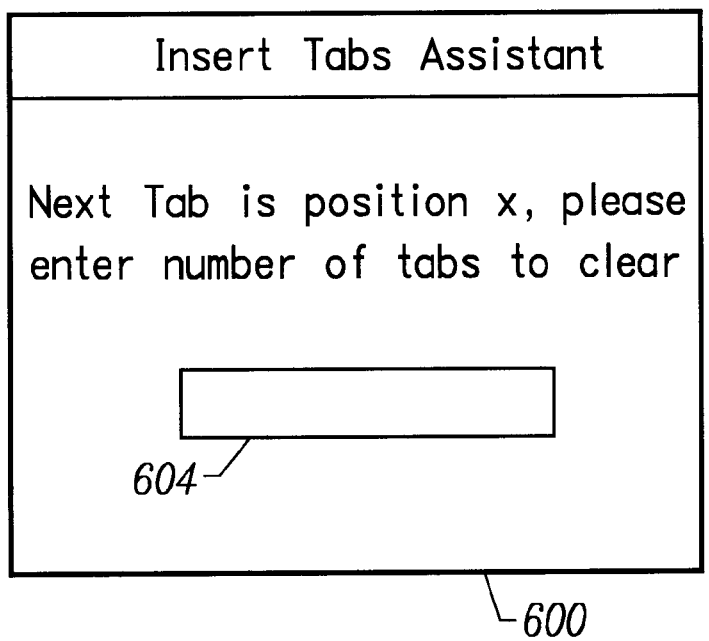
FIG. 15 is a diagram of the window for purging tabs.

FIG. 15 shows the "InsertTabs Assistant" window 600. In this window, a user can purge tabs by entering a number corresponding to the number of tabs to be purged in the "next tab is position X, please enter number of tabs to clear" box 604. X represents a variable for the current tab position. When the print job starts, the appropriate number of tabs will be purged. In the event of a paper jam, tab clearing is automatic.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for configuring a printer for printing ordered stock, the method comprising:
   providing a template comprising a plurality of printer configuration parameters regarding the ordered stock; and
   configuring said printer with said parameters.

2. The method of claim 1 further comprising providing a means to modify one of the parameters.

3. The method of claim 1 wherein said parameters include template name, document reading order, printer tray and ordered stock sheet number.

4. The method of claim 1 wherein said ordered stock is tab media.

5. The method of claim 4 wherein said parameters include number of positions on the tab stock, tab positions included, text offset per tab, tab media size, tab text rotation, tab font type, tab font size, tab starting position, tab text and tab text color.

6. The method of claim 5, further comprising purging a number of sheets from a printer tray coupled to the printer so that said tray feeds the correct ordered stock.

7. The method of claim 1, further comprising storing said template in memory means.

8. An apparatus for configuring a printer for printing ordered stock, the apparatus comprising:
   a module for providing a template comprising a plurality of printer configuration parameters regarding the ordered stock; and
   a module for configuring said printer with said parameters.

9. The apparatus of claim 8 further comprising a module for providing a means to modify one of the parameters.

10. The apparatus of claim 8 wherein said parameters include template name, document reading order, printer tray and ordered stock sheet number.

11. The apparatus of claim 8 wherein said ordered stock is tab media.

12. The apparatus of claim 11 wherein said parameters include number of positions on the tab stock, tab positions included, text offset per tab, tab media size, tab text rotation, tab font type, tab font size, tab starting position, tab text and tab text color.

13. The apparatus of claim 8, further comprising a module for purging a number of sheets from a printer tray coupled to the printer so that said tray feeds the correct ordered stock.

14. The apparatus of claim 8, further comprising a module for storing said template in memory means.

15. A method for configuring a printer for printing tab media, the method comprising:
   providing a plurality of tab media templates each containing a plurality of printer configuration parameters;
   providing template management means for allowing a user to perform any of: selecting, editing, adding, and deleting a template; and
   providing configuration means for configuring the printer with the printer configuration parameters provided by a user selected template.

16. The method of claim 15, wherein the template management means allows a user to modify any part of the template parameters.

17. The method of claim 15, further comprising providing updates to template parameters.

18. The method of claim 15, wherein the printer configuration parameters include template name, document reading order, printer tray and tab media sheet number.

19. The method of claim 15, wherein the template management means allows a user to rotate the text contained in a tab media to a desired selection.

20. The method of claim 15, wherein the printer configuration parameters include number of positions on the tab media, tab positions included, text offset per tab, tab media size, tab text rotation, tab font type, tab font size, tab starting position, tab text and tab text color.

21. The method of claim 15, further comprising purging the appropriate number of sheets from a printer tray so that the tray feeds the correct tab media.

22. The method of claim 15, further comprising storing, in a memory means, the plurality of tab media templates.

* * * * *